(12) United States Patent
Breucker et al.

(10) Patent No.: US 8,319,385 B2
(45) Date of Patent: Nov. 27, 2012

(54) METHOD AND BEARING FOR SUPPORTING ROTATABLE DEVICES, PARTICULARLY A MEDICAL SCANNER

(75) Inventors: Uwe-Otto Breucker, Geseke (DE); Wolfgang Claus, Lippetal (DE); Jörg Rollmann, Lippstadt (DE); Freidrich Löser, Riemerling (DE); Qinghua Zheng, Taufkirchen (DE); Markus Bauer, Freising (DK)

(73) Assignees: Rothe Erde GmbH, Dortmund (DE); ThyssenKrupp Transrapid GmbH, Kassel (DE)

( * ) Notice: Subject to any disclaimer, the term of this patent is extended or adjusted under 35 U.S.C. 154(b) by 299 days.

(21) Appl. No.: 12/664,538

(22) PCT Filed: Aug. 13, 2008

(86) PCT No.: PCT/EP2008/006644
§ 371 (c)(1),
(2), (4) Date: Dec. 14, 2009

(87) PCT Pub. No.: WO2009/021721
PCT Pub. Date: Feb. 19, 2009

(65) Prior Publication Data
US 2010/0181854 A1    Jul. 22, 2010

(30) Foreign Application Priority Data
Aug. 14, 2007 (DE) .................. 10 2007 038 489

(51) Int. Cl.
*H02K 7/09* (2006.01)

(52) U.S. Cl. ...................................... 310/90.5

(58) Field of Classification Search ............... 310/90, 310/90.5, 43
See application file for complete search history.

(56) References Cited

U.S. PATENT DOCUMENTS

| | | | | |
|---|---|---|---|---|
| 4,483,570 A * | 11/1984 | Inoue | ........................... | 310/90.5 |
| 4,683,111 A | 7/1987 | Helm et al. | | |
| 6,268,674 B1 | 7/2001 | Takahashi | | |
| 6,927,517 B2 * | 8/2005 | Brunet et al. | ................ | 310/90.5 |
| 2002/0036435 A1 * | 3/2002 | Ooyama et al. | .............. | 310/90.5 |
| 2003/0107282 A1 * | 6/2003 | Ooyama et al. | .............. | 310/90.5 |

FOREIGN PATENT DOCUMENTS

| | | |
|---|---|---|
| DE | 21 63 199 | 7/1973 |
| DE | 42 27 013 A1 | 2/1994 |
| DE | 10224100 | 4/2003 |
| DE | 10331150 | 2/2005 |
| DE | WO 2005/019654 | 3/2005 |
| DE | 102005000754 | 10/2006 |
| EP | 0071026 | 2/1983 |
| EP | 1 223 357 A1 | 7/2002 |
| GB | 2 348 680 | 10/2000 |
| JP | 5-122896 | 5/1993 |

* cited by examiner

*Primary Examiner* — Nguyen N Hanh
(74) *Attorney, Agent, or Firm* — McGlew and Tuttle, P.C.

(57) ABSTRACT

A method is provided for supporting rotatable devices, particularly a medical scanner having an inner ring and an outer ring. According to the invention, the inner ring and outer ring are guided without contact in the axial and/or radial direction by the magnetic field of electromagnets, and the distance between them is monitored and controlled by means of distance sensors. For a bearing implementing said method according to the invention, the outer ring is made in multiple parts and has a U-shaped cross section that is open to the inside in the assembled state, into which the inner ring (1, 10, 11) extends, and electromagnets and distance sensors are disposed in the axially and radially opposite areas of the inner ring or outer ring.

13 Claims, 3 Drawing Sheets

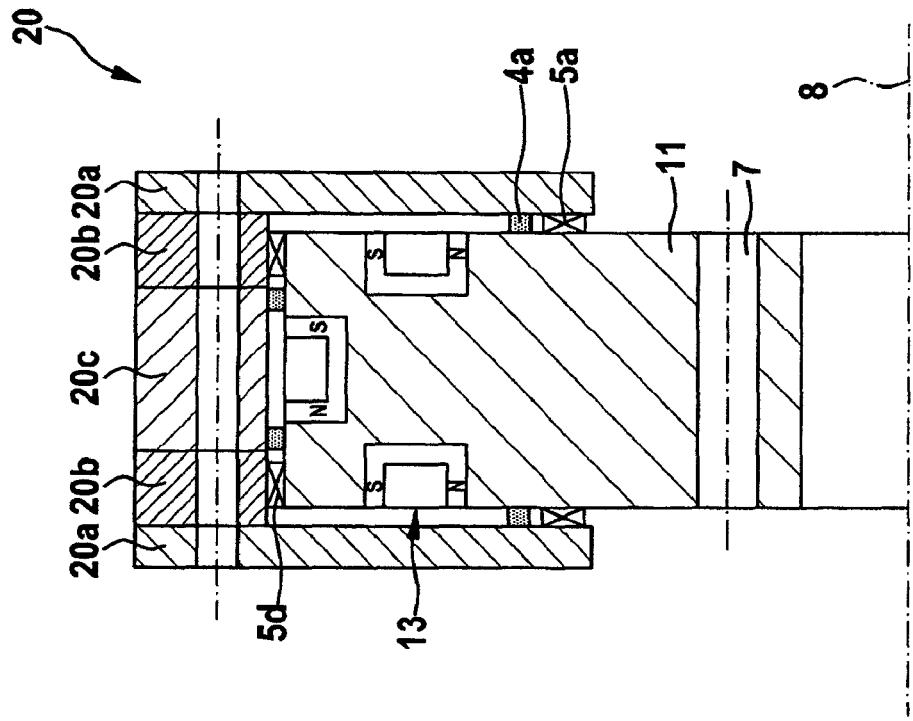
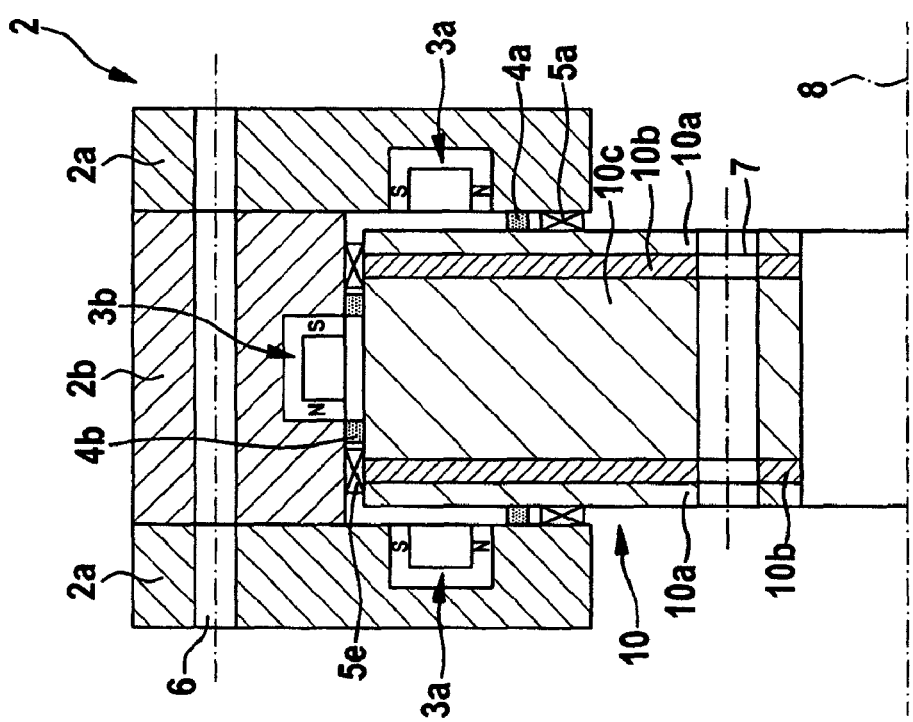

METHOD AND BEARING FOR SUPPORTING ROTATABLE DEVICES, PARTICULARLY A MEDICAL SCANNER

CROSS REFERENCE TO RELATED APPLICATIONS

This application is a United States National Phase application of International Application PCT/EP2008/006644 and claims the benefit of priority under 35 U.S.C. §119 of German Patent DE 10 2007 038 489.2 filed Aug. 14, 2007, the entire contents of which are incorporated herein by reference.

FIELD OF THE INVENTION

The present invention relates to a method for bearing rotatable devices, particularly a medical scanner, comprised of at least one inner ring and at least one outer ring, and to a bearing particularly for implementing said method.

BACKGROUND OF THE INVENTION

Noise emission represents a significant design criterion, particularly for medical scanners. An important noise source on operating a scanner is the anti-friction bearing which continually generates structure-borne noise by a permanent rotation (rolling contact) of the rolling bodies and transfers it to the connected structures which emit it as air-borne noise.

To reduce noise emissions, anti-friction bearings are known in which for example the rotor wires are embedded into a non-metallic vulcanized intermediate layer (see DE 10 2005 000 754 B3) or in which the rotor rings are disposed in liner rings made of elastomer (see DE 103 31 150 B4) or in which an attenuating material not essentially increasing the built size is disposed at least between a rotor wire and a bearing ring in an enhanced rotor wire bed of the bearing ring (see EP 71 026 A1).

With the afore-mentioned bearings, structure-borne noise from the rolling contact is attenuated by additional joints and plastic elements. With high peripheral speeds, however, those measures described herein above are frequently insufficient to keep the noise level of the bearing at an adequately low level.

SUMMARY OF THE INVENTION

Now, therefore, it is the object of the present invention to provide a method for bearing and a bearing for such devices in which noise emission can be further reduced.

To avoid excitation of structure-borne noise by the rolling contact, a large-size anti-friction bearing is proposed in which the stator ring is separated from the rotor ring by the magnetic field of several electromagnets so that there is no metallic contact between both bearing rings on operation. The electromagnets are arranged both in axial and radial direction of the bearing axis in order to take-up the bearing forces and moments to be supported. The distribution of the electromagnets over the bearing circumference can be even or adapted to the load. The bearing furthermore contains optical or inductive distance sensors which measure and/or monitor the gap distance between the outer ring and inner ring, preferably optically, inductively or in a different kind A computer-aided control of the magnets is so performed that the gap distance is kept constant. With an inventive bearing, an arrest bearing is furthermore provided which carries the rotating ring in case of a failure in the electric power supply of the electromagnets. This arrest bearing can be configured as a sliding bearing or as an anti-friction bearing.

By way of an appropriate arrangement and controlled activation of the electromagnets, a torque driving the corresponding rotor can be applied onto the bearing. The electromagnets can also be utilized to vary the stiffness of the bearing and to avoid vibrations. By increasing the electric power and thus by increasing the force in the electromagnets, the stiffness can be increased in a well-aimed manner. It is hereby possible to vary the natural frequency of the bearing and thus to avoid resonant frequencies. Moreover, it has become evident that the failure probability of the magnet bearing can be reduced by a redundant arrangement of the distance sensors and electromagnets to such an extent that one may even dispense with the arrest bearings.

Finally, the electromagnets and distance sensors according to the present invention can be utilized on first commissioning to balance the bearing. For balancing, an off center weight with a known mass, known axis distance and known peripheral position is mounted once or several times at the rotor. In or with an additional balancing facility, the reaction, e.g. the burden or shifting of the rotor, is subsequently measured.

In accordance with actually known methods, it is possible to determine from these results the place and the additional mass that must be fastened to the rotor to operate the rotor without off-center weight. With the inventive bearing, a circulating force corresponding to the known mass with a known axis distance and place can now be applied on the rotor by the aid of the electromagnets. The reaction of the rotor with a constant speed can then be measured by the distance sensors. These measuring results are then utilized in operation with a distinct circulating force to choose the additional mass and its place of mounting.

For the special case that an imbalance occurs during running operation, this imbalance can be compensated for even during running operation initiated by the measurement by the aid of the control with a circulating magnet force.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a sectional view showing an arrangement according to FIG. 1 with a multiple-part inner ring;

FIG. 4 is a sectional view showing an arrangement according to FIG. 2 with a multiple-part outer ring.

DESCRIPTION OF THE PREFERRED EMBODIMENTS

Figure 1:
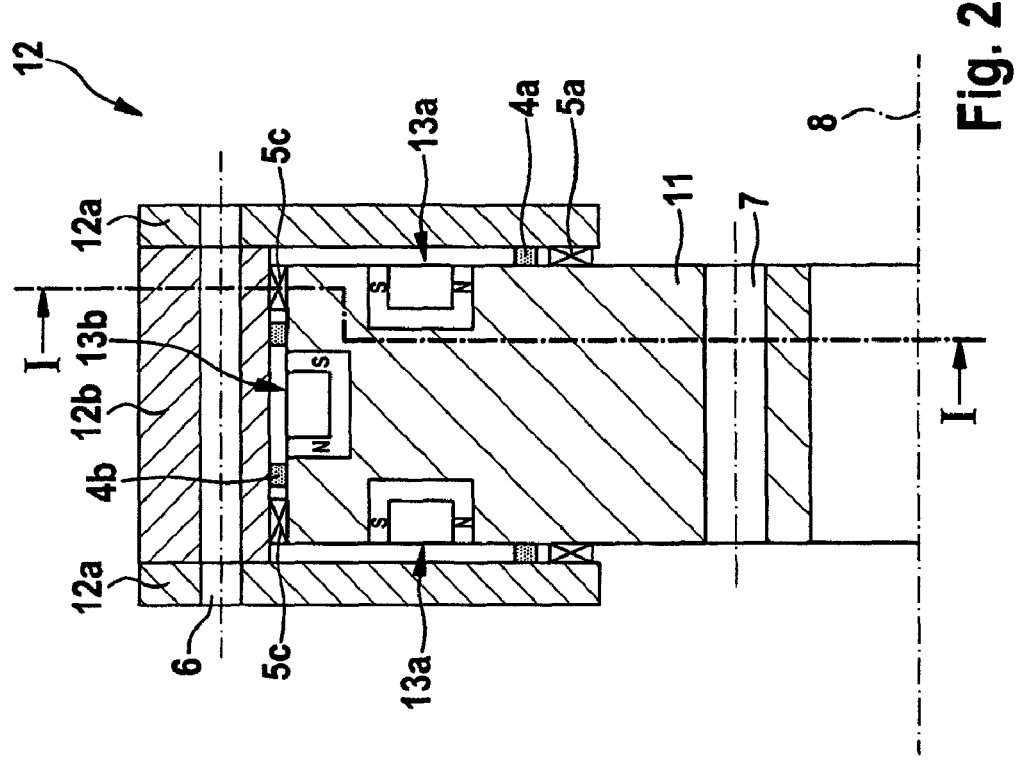
FIG. 1 is a sectional view showing an arrangement with electromagnets disposed in an outer ring.

Referring to the drawings in particular, according to FIG. 1, an outer ring 2 is configured as a stator, with electromagnets 3a being disposed in the individual outer rings 2a and 2c and with the electromagnets 3b being disposed in the outer ring 2b which lie opposite to the two axial surfaces and to the radial surface of the inner ring 1 serving as rotor. By the aid of these electromagnets 3a, 3b, the inner ring 1 and the outer ring 2 are kept at an even distance to each other during the rotation about the common rotating axis B so that there is no metallic contact between both bearing rings on operation. To monitor and control the gap distance, distance sensors 4a, 4b are provided near the electromagnets 3a, 3b. The arrest bearings 5a-5e are fastened either to the outer ring 2, 12, 20 or to the inner ring 1, 10, 11 and in normal operation they have a small distance towards the opposite area. On failure of the electric power supply to electromagnets 3a, 3b, these arrest bearings 5a-5e can carry the relevant rotating ring. Bores 6 and 7 serve for fastening the relevant ring to the connecting structures not shown here.

Figure 2:
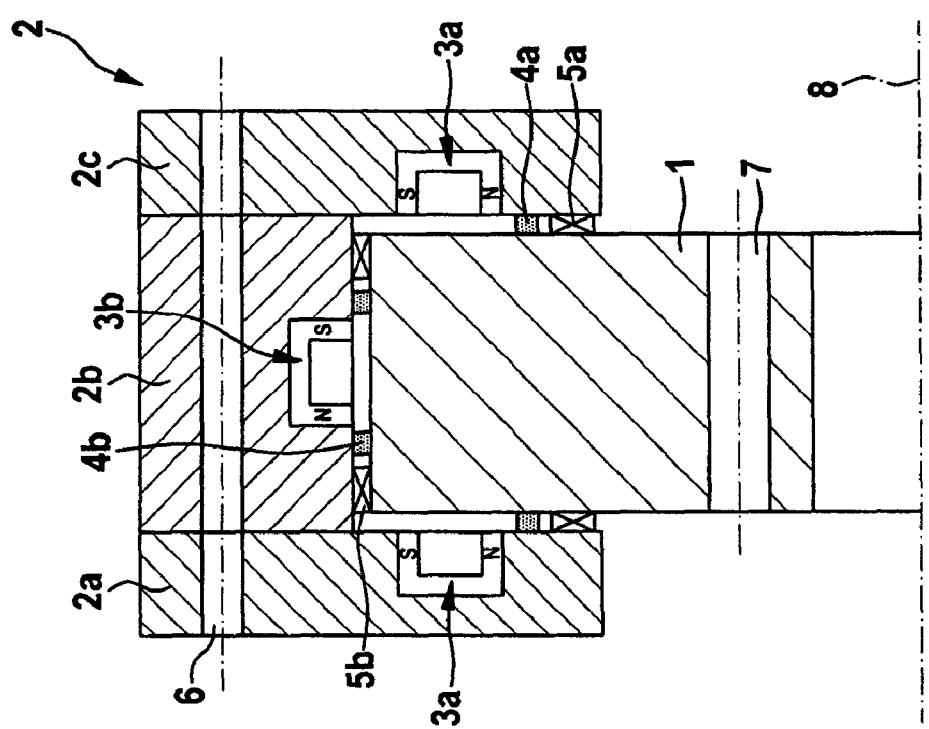
FIG. 2 is a sectional view showing an arrangement with electromagnets disposed in an inner ring.

In FIG. 2, the inner ring 11 is configured as a stator at which the electromagnets 13a, 13b are arranged. The outer ring 12 with the individual rings 12a, 12b encloses the outer end of inner ring 11 in a U-shaped form, with the arrest bearings 5a, 5c and the distance sensors 4a, 4b being similarly arranged between the two rings 11 and 12.

In FIG. 3, the inner ring 10 is of a multiple-part structure, with a non-magnetic ring 10b being arranged between the two magnetic inner rings 10a, 10c. At the outer periphery, this inner ring 10b can act as a gliding element towards the arrest bearing 5e, with plastic or bronze being utilized as sliding bearing material.

In FIG. 4, the outer ring 20 is of a multiple-part structure, with the non-magnetic outer ring 20b being located between the magnetic outer rings 20a and 20c. The non-magnetic rings 10b, 20b serve for magnetic isolation between the adjacent rings 10a, 10c, and/or 20a, 20c. The non-magnetic outer ring 20b, too, can be utilized as gliding element towards the arrest bearing 5d.

Figure 5:
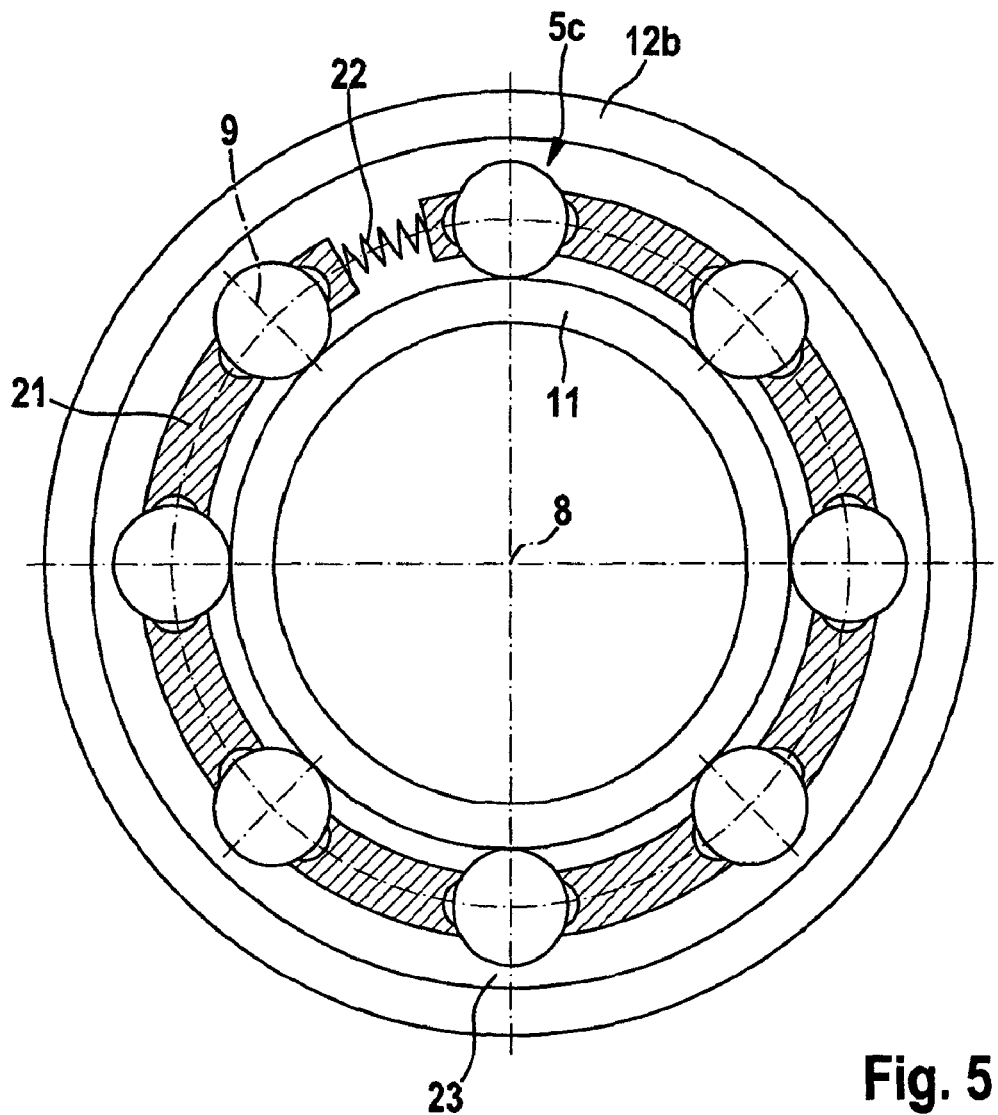
FIG. 5 is a sectional view showing according to line I-I of FIG. 2.

In an enhanced representation, FIG. 5 shows the arrangement of a ball bearing with balls 9, with said balls being guided in circulation in a cage 21. By the aid of spring 22, a pre-tensioned cage 21 is provided for. It bears the advantage of assuring that the arrest bearing 5c configured as an anti-friction bearing is only moved if the arrest bearing 5c is really burdened. In case of using a ball bearing according to the layout as per FIG. 2, the arrest bearing 5a there can be dispensed with. It is also significant to maintain a distance 23 in normal operating status of the bearing between the outer ring 12b and the balls 9. If a contact is established in this area, the ball bearing prevents excessive friction.

While specific embodiments of the invention have been described in detail to illustrate the application of the principles of the invention, it will be understood that the invention may be embodied otherwise without departing from such principles.

The invention claimed is:

1. A bearing for rotatable devices, the bearing comprising:
an inner ring;
an outer ring, wherein the outer ring is made in multiple parts and has a U-shaped cross section that is open to an inside in the assembled state, into which the inner ring extends, one of said inner ring and said outer ring defining a rotating ring;
electromagnets;
distance sensors, the electromagnets and distance sensors being disposed in the axially and radially opposite areas of the inner ring or outer ring; and
one or more arrest bearings carrying the rotating ring in case of a failure of electric power supply to the electromagnets, the one or more arrest bearings being disposed next to or in the area of the electromagnets, wherein at least one of the arrest bearings is configured as an anti-friction bearing with balls or rollers that are held in a cage pre-tensioned with at least one spring.

2. A bearing according to claim 1, wherein the electromagnets are disposed in recesses being open towards the opposite ring either in the outer ring or inner ring.

3. A bearing according to claim 1, wherein one or several distance sensors working optically, inductively or in a contactless manner are disposed next to or in the area of the electromagnets.

4. A bearing according to claim 1, wherein the one or more arrest bearings is configured as a sliding bearing or anti-friction bearing.

5. A bearing according to claim 1, wherein the distance sensors and electromagnets are redundantly disposed in the bearing.

6. A bearing according to claim 1, wherein the distance sensors and electromagnets and a control unit are connected to an uninterruptible power supply.

7. A bearing according to claim 1, wherein the outer ring on an outer diameter thereof is provided with possibilities for engagement by a toothed belt or a V-belt.

8. A bearing according to claim 1, wherein the inner rings or outer rings which carry no electromagnet are comprised of several magnetic rings that are separated from each other by non-magnetic rings.

9. A bearing according to claim 8, wherein the non-magnetic rings act as gliding elements of the one or more arrest bearings.

10. A bearing according to claim 8, wherein the nonmagnetic rings are made of plastic or bronze.

11. A bearing according to claim 1, wherein the distance sensors and electromagnets are built-in in a protected environment and molded such that the bearing can also be implemented in liquid media.

12. A bearing for rotatable devices, the bearing comprising:
an inner ring;
an outer ring, wherein the outer ring is made in multiple parts and has a U-shaped cross section that is open to an inside in the assembled state, into which the inner ring extends;
electromagnets; and
distance sensors, the electromagnets and distance sensors being disposed in the axially and radially opposite areas of the inner ring or outer ring, wherein the inner rings or outer rings which carry no electromagnet are comprised of several magnetic rings that are separated from each other by non-magnetic rings.

13. A bearing for rotatable devices, comprising:
electromagnets;
an inner ring;
an outer ring, one of said inner ring and said outer ring defining a rotating ring, said outer ring being formed from a number of parts and said outer ring having a U-shaped, inwardly open cross-section in an assembled state, said inner ring protruding into said outer ring, said inner ring and said outer ring being guided in a contact-free manner in one or more of an axial direction and a radial direction by a magnetic field of said electromagnets;
a plurality of safety bearings;
distance sensors, wherein a distance between said inner ring and said outer ring is monitored and controlled via said distance sensors, said electromagnets and said distance sensors being disposed in axially and radially opposing regions of the inner ring or the outer ring, at least one of said safety bearings being disposed next to, or in a region of, the electromagnets, said at least one of said safety bearings supporting the rotating ring in the event of a failure in a power supply to said electromagnets, one or more of said safety bearings being formed as a radial slide bearing, wherein the inner ring or the outer ring, which does not support any electromagnets, comprises a plurality of magnetic rings which are separated from each other by non-magnetic rings, and the non-magnetic rings act as slide elements of the one or more safety bearings which is formed as said radial slide bearing.

* * * * *